United States Patent [19]

Tokoro

[11] Patent Number: 5,547,688

[45] Date of Patent: Aug. 20, 1996

[54] METHOD FOR FEEDING AN ANIMAL UBIDECARENONE TO PREVENT DISCOLORATION OF MEAT AND FISH

[75] Inventor: Toru Tokoro, Tokyo, Japan

[73] Assignee: RTA Associates, Inc., Tokyo, Japan

[21] Appl. No.: 441,310

[22] Filed: May 15, 1995

Related U.S. Application Data

[62] Division of Ser. No. 355,194, Dec. 8, 1994.

[30] Foreign Application Priority Data

Dec. 8, 1993 [JP] Japan ................... 5-307643

[51] Int. Cl.$^6$ ............. A23B 4/20; A23L 1/314
[52] U.S. Cl. ............. 426/2; 426/265; 426/332; 426/545; 426/546; 426/641; 426/643
[58] Field of Search ............. 426/281, 332, 426/641, 643, 265, 268, 321, 545, 546, 2; 119/174, 230

[56] References Cited

U.S. PATENT DOCUMENTS

| | | | |
|---|---|---|---|
| 4,325,942 | 4/1982 | Taki et al. | 424/94 |
| 4,483,873 | 11/1984 | Phashi et al. | 424/94 X |
| 5,254,338 | 10/1993 | Sakai et al. | 424/78.35 |
| 5,258,179 | 11/1993 | Bracco et al. | 426/545 X |

FOREIGN PATENT DOCUMENTS

| | | |
|---|---|---|
| 424679A2 | 5/1991 | European Pat. Off. . |
| 494654 | 7/1992 | European Pat. Off. . |
| 1343482 | 3/1961 | France . |
| 49-058084 | 6/1974 | Japan . |
| 56-140894 | 11/1981 | Japan . |
| 733612 | 5/1980 | U.S.S.R. . |

OTHER PUBLICATIONS

Kajiyama Shiro et al, *Patent Abstracts of Japan*, vol. 12, No. 117 (C–487) Apr. 13, 1988 & JP–A–62 240 643 21 Oct. 1987.

S. Yamashita, *Database WPI*, Week 7804, Derwent Publications Ltd., London, GB; An 78–07543A & JP–A–52 148 615, 10 Dec. 1977.

MIBA, *Database WPI*, Week 7549, Derwent Publications Ltd., London GB; An 75–80862W & JP–A–50 082 219, 28 Nov. 1973.

Mitsubishi Gas Chem., *Database WPI*, Week 8141, Derwent Publications Ltd., London, GB; An 81–74481D & JP–A–56 106 597, 24 Aug. 1981.

Matsuda Yoshihisa et al, *Patent Abstracts of Japan*, vol. 15, No. 60(C–805) 13 Feb. 1991 & JP–A–22 089 513, 29 Nov. 1990.

*Primary Examiner*—Arthur L. Corbin
*Attorney, Agent, or Firm*—Burns, Doane, Swecker & Mathis, L.L.P.

[57] ABSTRACT

A method for maintaining the freshness of meat, fish or processed food made from meat or fish, comprising treating it with ubidecarenone to prevent discoloration thereof. The freshness thereof can be also maintained by giving ubidecarenone to an animal being bred for the production of meat or fish. Furthermore, ubidecarenone has growth-promoting effect on animals when administered to them.

8 Claims, 6 Drawing Sheets

METHOD FOR FEEDING AN ANIMAL UBIDECARENONE TO PREVENT DISCOLORATION OF MEAT AND FISH

This application is a divisional of application Ser. No. 08/355,194, filed Dec. 8, 1994.

BACKGROUND OF THE INVENTION

The present invention relates to a method for maintaining the freshness, and particularly the color, of meat, fish or processed foods made from meat or fish, and to a method for promoting the growth of animals for the production of meat.

Meat of livestock and some fish are of a bright red color when fresh, but the color changes to brown or gray with time. Thus, discoloration of meat is an important indication of aging, and consumers usually select meat or fish based on color as a guide to quality. Japanese consumers pay in particular attention to the color of raw fish because they often serve it in a raw state. They also pay much attention to the color of raw meat. The discoloration of meat and fish is predominantly caused by oxidation of haem pigments. The haem pigments contained in meat include myoglobin in myofibril and hemoglobin in erythrocytes of residual blood. It has been attempted to maintain the color of meat, fish, and processed foods made of meat or fish by the use of additives, but the use of additives in the past has been insufficiently effective or has had safety problems.

Aging of meat is indicated by the following phenomena :(1) fading caused by oxidation of haem pigments, (2) spoilage by oxidation of lipids, (3) rotting by microorganisms, (4) losses by dripping and (5) changes in texture. Various methods for suppressing aging of meat have been investigated. Particularly, in recent years, purchases of food have been decreasing in quantity due to smaller families, and furthermore people desire faster and simpler cooking. Accordingly, it is becoming more common for meat or fish to be sold in small packs and in the form of slices, but sliced meat is more susceptible to aging, particularly fading, than is a block of meat. Thus, the need exists for an effective method for suppressing aging of meat, fish and processed foods, thereby maintaining the freshness thereof.

One known method for preventing aging of meat, for example, is to prevent oxidation of oils and fats contained in meat or fish by using an antioxidant to suppress spoilage caused by lipid oxidation. Vitamin C, natural vitamin E, and erythorbic acid can be used as an antioxidant for fresh meat or fish in Japan, but they are not sufficient to maintain freshness, particularly color. Also, antioxidants such as butylhydroxy toluene (BHT) and butylhydroxy anisole (BHA) have been used for oils and fats used in processing, but it was reported that BHT and BHA are carcinogenic (Ito et. al J. Matl. Cancer Inst. 70, 343) and their use is prohibited by administrative guidance.

Also, ascorbic acid (vitamin C) and polyphosphoric acid are widely used in order to improve color, water content and texture of meat, fish, and processed foods made from meat or fish, particularly preserved meat. However, vitamin C is apt to interact with Fe in meat to change the color of meat, i.e., to cause browning, and excess intake of polyphosphoric acid results in abnormalities in bones. Therefore, they are not desirable as additives for safe foods.

Additionally, it is rather difficult to let an additive penetrate into a large block of fresh meat or preserved meat. Therefore an additive useful as a feed additive to maintain the quality of meat would be desirable, but such an additive has not been developed successfully.

As mentioned above, an additive for suppressing aging and maintaining freshness of meat which is effective and safe has not been known, and there has not been an additive which does not treat meat directly and is added to a feed to maintain the quality of meat. Also, a feed additive which is effective for maintaining the quality of meat and can promote the growth of animals was not known.

SUMMARY OF THE INVENTION

An object of the present invention is to provide a method for maintaining the freshness of meat, fish, or processed foods made from meat or fish, by using a safe and effective agent for maintaining the freshness.

Another object of the present invention is to provide a method for maintaining the freshness of meat, etc. by giving an agent to an animal being bred for the production of meat. The further object of the present invention is to provide a method for promoting the growth of livestock etc.

The present inventors have investigated an effective method for maintaining the freshness of meat, and have found unexpectedly that ubidecarenone is useful as an agent for maintaining the freshness of meat. According to the present invention, the freshness of uncooked meat or processed meat can be maintained by treating it with ubidecarenone, or by adding ubidecarenone to livestock feed, to prevent the aforementioned (1), (2), (4) and (5) phenomena of aging, and particularly to maintain color. Additionally, the inventors have found that ubidecarenone acts as a growth promotor for animals when added to feed, resulting in improvement of the productivity of livestock, poultry and cultured fish.

The present invention provides a method for maintaining the freshness of meat, fish, or processed food made from meat or fish, comprising treating the meat, fish, or processed foods with ubidecarenone, and a method for maintaining the freshness of meat or fish, comprising giving ubidecarenone to an animal being bred for the production of meat or fish. The agent for maintaining the freshness comprises ubidecarenone as an active ingredient.

Furthermore, the present invention is directed to a method for promoting the growth of livestock, poultry, or cultured fish in the production of meat or fish comprising giving ubidecarenone to an animal being bred. The agent for promoting the growth of an animal comprises ubidecarenone as an active ingredient. This agent can be used as a feed additive and can promote the growth of animals, or improve the productivity of breeders of animals.

The above agent for maintaining freshness or for improvement of productivity is more effective when further comprising vitamin E and/or vitamin C.

The agent used in the present invention is safe and exhibits the superior effect of maintaining the freshness of meat, fish and processed foods made from meat or fish, especially the color. This agent can promote growth in animals as well as maintain the freshness of meat obtained from the animals, when administered to the animals as a feed additive, for example.

DETAILED DESCRIPTION OF THE INVENTION

Ubidecarenone is a substance found from lipids in mitochondria of cow heart by Crane at the University of Wisconsin and is represented by the following structural formula (I):

It is known that ubiquinones including ubidecarenone are widely distributed in the animal and vegetable kingdom (K. Folkers et. al, Chiba Foundation Symposium, 1960), particularly in hearts, livers or alimentary canals of various animals (F. R. Koniuszy et. al, Arch. Biophis., 87, 298, 1960). In vertebrates, fishes except for eels, amphibians, reptiles, birds and mammals except for mice and rats posses ubidecarenone (P. H. Gale et. al, Arch. Biochem. Biophys., 104, 169, 1964). In humans, it is distributed in particularly high concentration in livers, hearts, kidneys, spleens, and adrenal glands (P. H. Gael et. al, Arch. Biophys., 93, 211, 1961).

The mechanism of in vivo action of ubidecarenone has not been completely elucidated, but it is generally considered that ubidecarenone is a coenzyme which participates in the electron transport system in mitochondria, thereby playing an important part in activating cellular respiration and increasing production of ATP conjugately and activating respective tissues in an animal body. Ubidecarenone has an activity for improving disorders of heart muscle due to ischemia, and therefore is presently used as a therapeutic agent for congestive heart failure. Thus, ubidecarenone is known as a medicine, but could not be expected to be effective as an agent for maintaining the freshness of meat.

Ubidecarenone used in the present invention may be prepared by any known method such as chemical synthesis or fermentation. Purified ubidecarenone is in the form of a yellow or orange powder having a melting point of about 48° C. and which can be dissolved in chloroform, benzene, carbon tetrachloride, acetone and ether, but cannot be dissolved in ethanol, water and methanol. In the present invention, microorganisms containing ubidecarenone such as red yeast (for example, *Rhodotorula hasegawae*) and mold (for example, *Chaetomium funicola*) can be used as a feed additive as well as purified product.

Since ubidecarenone is widely distributed in various animals and vegetables as a substance participating in cellular respiration, and since it is also contained in food (A. C. Page et. al, Arch. Biochem. Biophys., 85, 474, 1959), its toxicity has been examined and its safety has been confirmed.

The agent for maintaining freshness used in the present invention comprises ubidecarenone as an active ingredient, and optionally appropriate carriers, media, or additives. The agent may be in various forms including solid forms such as powders and granules, or liquid forms such as water solutions and emulsions. Additives used in the formulation include synergistic additives such as citric acid and sorbit, emulsifying agents such as lecithin and propylene glycol, and emulsion stabilizers such as CMC and gelatin. The agent in solid forms such as powders may be diluted when used to the desired concentration with medium such as water, or the agent which is prepared in a liquid form of high concentration may be diluted appropriately when used. Also, the agent may be a liquid agent prepared at the desired concentration and introduced into a spray vessel to be administered by spraying. Furthermore, when the present agent is used by feeding it to animals as it is or when it is used as a feed additive because it maintains the freshness, and particularly the color, of meat or fish when provided to animals, it is preferably used in the form of powders, granules or pellets.

The word "meat" includes beef, horseflesh, pork, mutton or lamb, chicken, etc., and the word "fish" includes lean fish meat such as young yellowtail and tuna, meat of mackerel, deep snapper etc. In addition to raw meat or fish, processed foods, such as ham, sausages, canned food, or dried fish can be used.

Examples of methods for treating meat or fish with ubidecarenone in the form of an aqueous solution or emulsion include dipping, spraying, and injection using a meat injector.

In using the agent by dipping, spraying or injection, ubidecarenone is incorporated into an aqueous solution or emulsion. In this case, the concentration of ubidecarenone in the solution or emulsion is preferably in the range of 5–200 ppm.

When meat of livestock is treated with the agent comprising ubidecarenone, the agent may be added in an appropriate stage during the production of meat. For, example, carcasses immediately after slaughter may be dipped in or sprayed with the agent. When the treated meat is shipped, discoloration thereof can be prevented to maintain freshness till cutting or slicing. Also, when a block after cutting or sliced meat is treated with the agent by dipping or spraying, it is possible to maintain the freshness of the meat until it is sold to consumers.

When the agent comprising ubidecarenone is used to treat fish, a fish which is caught may be treated by dipping it into or spraying it with the agent in liquid form prior to shipping. The agent is effective for maintaining the freshness of the fish until sold at retail. Also, when fish is freezed during storage, the fish may be frozen after being dipped in or sprayed with the agent.

Furthermore, the agent comprising ubidecarenone can be administered to animals as ubidecarenone or as microorganisms containing ubidecarenone. It can be administered directly or as a feed additive. In this case, it can be added to feed in an amount of 5–200 ppm based on the feed. The resulting meat and fish retains its freshness as if the case when meat or fish is dipped in or sprayed with the present agent.

In addition to maintaining freshness, when ubidecarenone is ingested by animals, it promotes growth in animals. As shown in the Examples below, when a feed containing ubidecarenone is used, the body weight of animals increases and the percentage of feed demand decreases. Accordingly, the use of ubidecarenone increases the productivity of livestock producers.

Also, meat and fish treated with the agent comprising ubidecarenone retains a fresh color tone, and therefore, when producing processed food from the meat, only small amounts of additives such as color formers are required. The agent comprising ubidecarenone can also be added during processing.

In order to further illustrate the effect of the present invention, the results of actually applying ubidecarenone to meat or fish are shown below.

EXPERIMENT I

1. Experimental Method 12 slices of meat each 5 mm thick were obtained from each of Lib eye (Longissmus dorsi) and surroundings of Lib eye of right and left pork muscle of a pig slaughtered two days before.

500 mg of ubidecarenone, 40 mg of hydrogenated lecithin, 10 g of sorbit and 40 ml of purified water were mixed. The resulting mixture was heated and subjected to ultrasonic treatment under nitrogen gas for 90 minutes. To this, purified water was added to form 500 ml of liquid for treatment. 6 slices of Lib eye and surroundings of Lib eye, respectively, were dipped sufficiently and kept at 4° C. for 4 hours. Then, each of these slices of meat was taken out, wiped and wrapped with Saran wrap. 3 slices of these were further placed in a plastic bag. The other 6 slices which were not treated with ubidecarenone (a control group) were similarly wrapped.

During the experiment, the above samples were stored in a low temperature controlled bath at 4° C. and are measured on ice. The properties which were measured are as follows:

(1) pH Measurement

The pH measurement is carried out on a glass electrode pH meter (TOA-HM10K model) by contacting the electrode directly with the surface of the sliced meat.

(2) Determination of Color of Meat

The color of meat is observed with the naked eye and compared with a pork color standard (CHIKUSHI system).

(3) Colorimetry by Model ND-1001D Colorimetry Color Difference Meter

Size of reflection sample stand and pipe: 10 mm

Standard White Board Value: X 91.26 Y 93.20 Z 109.13

Z circuit:

LSD: Measurement by UCS-Hunter indication (L,a,b) system using unit "0"

Colorimetery: Any three points in the Lib eye and surroundings of Lib eye, respectively, were measured and the mean of three points was calculated.

2. Results

The change from just before treatment to the 6th day is shown in Tables 1 and 2.

TABLE 1

|  |  | Color Score | | pH | |
|---|---|---|---|---|---|
|  |  | Lib eye | Surround.* | Lib eye | Surround.* |
| Before | Control | 3.7 ± 0.6 | 5.8 ± 0.3 | 5.61 ± 0.18 | 6.19 ± 0.18 |
| Treatment | Test Group | 3.6 ± 0.6 | 5.7 ± 0.2 | 5.74 ± 0.13 | 6.20 ± 0.11 |
| After | Control | 3.8 ± 0.5 | 5.8 ± 0.2 | 5.6 ± 0.10 | 6.23 ± 0.23 |
| Treatment | Test Group | 2.8 ± 0.4 | 4.5 ± 0.0 | 5.67 ± 0.09 | 6.19 ± 0.16 |
| 1st Day | Control | 3.8 ± 0.4 | 6.0 ± 0.3 | 5.63 ± 0.08 | 6.22 ± 0.19 |
|  | Test Group | 3.1 ± 0.2 | 4.8 ± 0.2 | 5.75 ± 0.16 | 6.26 ± 0.12 |
| 2nd Day | Control | 4.0 ± 0.3 | 6.0 ± 0.4 | 5.58 ± 0.12 | 6.25 ± 0.20 |
|  | Test Group | 3.3 ± 0.4 | 4.9 ± 0.4 | 5.75 ± 0.11 | 6.27 ± 0.15 |
| 3rd Day | Control | 4.2 ± 0.2 | 6.1 ± 0.3 | 5.69 ± 0.12 | 6.23 ± 0.17 |
|  | Test Group | 3.6 ± 0.2 | 5.2 ± 0.4 | 5.77 ± 0.08 | 6.23 ± 0.12 |
| 4th Day | Control | 4.6 ± 0.2 | 6.2 ± 0.4 | 5.74 ± 0.10 | 6.25 ± 0.15 |
|  | Test Group | 3.8 ± 0.3 | 5.3 ± 0.3 | 5.67 ± 0.06 | 6.23 ± 0.09 |
| 5th Day | Control | 4.5 ± 0.3 | 6.3 ± 0.3 | 5.79 ± 0.10 | 6.37 ± 0.20 |
|  | Test Group | 3.6 ± 0.2 | 5.3 ± 0.4 | 5.78 ± 0.08 | 6.40 ± 0.18 |
| 6th Day | Control | 4.6 ± 0.2 | 6.4 ± 0.2 | 5.21 ± 0.10 | 6.42 ± 0.22 |
|  | Test Group | 3.7 ± 0.2 | 5.3 ± 0.2 | 5.23 ± 0.09 | 6.38 ± 0.10 |

*Surround. = Surroundings of Lib eye.

TABLE 2

|  |  | L Value | | a Value | | b Value | |
|---|---|---|---|---|---|---|---|
|  |  | Lib eye | Surround.* | Lib eye | Surround.* | Lib eye | Surround.* |
| Before | Control | 33.3 ± 1.3 | 29.7 ± 2.3 | 3.6 ± 0.8 | 9.5 ± 1.1 | 2.9 ± 0.4 | 4.2 ± 0.3 |
| Treatment | Test | 34.3 ± 1.1 | 29.0 ± 1.5 | 3.8 ± 0.8 | 10.0 ± 0.7 | 2.5 ± 0.5 | 4.1 ± 0.3 |
| After | Control | 34.1 ± 1.8 | 28.1 ± 1.2 | 3.3 ± 0.5 | 9.5 ± 1.0 | 2.1 ± 0.4 | 3.0 ± 0.3 |
| Treatment | Test | 42.7 ± 1.8 | 39.3 ± 2.2 | 1.7 ± 0.7 | 5.9 ± 0.7 | 2.6 ± 0.4 | 3.6 ± 0.5 |
| 1st Day | Control | 32.7 ± 1.9 | 27.9 ± 1.7 | 3.5 ± 0.7 | 9.7 ± 0.8 | 2.4 ± 0.4 | 3.4 ± 0.8 |
|  | Test | 38.1 ± 2.0 | 32.8 ± 1.1 | 2.4 ± 0.4 | 8.2 ± 0.9 | 3.2 ± 0.5 | 4.2 ± 0.3 |
| 2nd Day | Control | 32.6 ± 0.8 | 27.4 ± 1.4 | 3.6 ± 0.6 | 10.3 ± 0.5 | 2.5 ± 0.3 | 3.3 ± 0.2 |

TABLE 2-continued

|  |  |  |  |  |  |  |  |
|---|---|---|---|---|---|---|---|
|  | Test | 38.2 ± 2.2 | 33.0 ± 1.7 | 3.2 ± 0.6 | 8.9 ± 0.6 | 3.9 ± 0.7 | 4.5 ± 0.3 |
| 3th Day | Control | 32.9 ± 1.6 | 27.8 ± 1.5 | 3.9 ± 0.9 | 10.0 ± 0.7 | 2.7 ± 0.2 | 3.5 ± 0.3 |
|  | Test | 39.3 ± 1.9 | 33.4 ± 0.9 | 2.8 ± 0.4 | 8.4 ± 0.3 | 3.5 ± 0.2 | 4.1 ± 0.3 |
| 4th Day | Control | 35.0 ± 1.2 | 29.5 ± 1.0 | 3.6 ± 0.8 | 8.8 ± 0.8 | 2.4 ± 0.3 | 2.9 ± 0.3 |
|  | Test | 39.0 ± 1.5 | 33.5 ± 1.2 | 3.4 ± 0.4 | 8.9 ± 1.0 | 3.8 ± 0.4 | 4.4 ± 0.3 |
| 5th Day | Control | 34.4 ± 1.3 | 29.4 ± 1.3 | 3.5 ± 0.9 | 10.0 ± 0.8 | 2.5 ± 0.5 | 3.0 ± 0.3 |
|  | Test | 39.1 ± 2.2 | 33.1 ± 1.3 | 3.5 ± 0.7 | 8.9 ± 0.9 | 3.7 ± 0.5 | 4.2 ± 0.5 |
| 6th Day | Control | 34.1 ± 1.3 | 20.0 ± 1.9 | 3.2 ± 1.1 | 10.2 ± 1.3 | 2.5 ± 0.4 | 3.2 ± 0.3 |
|  | Test | 39.5 ± 2.0 | 33.8 ± 1.6 | 3.1 ± 0.7 | 9.0 ± 0.8 | 3.9 ± 0.6 | 4.0 ± 0.5 |

|  |  | $\tan \theta$ (color strength) | | $\sqrt{(L^2 + a^2 + b^2)}$ (chroma) | |
|---|---|---|---|---|---|
|  |  | Lib eye | Surround.* | Lib eye | Surround.* |
| Before | Control | 0.82 ± 0.18 | 0.45 ± 0.05 | 33.6 ± 1.3 | 31.4 ± 2.1 |
| Treatment | Test | 0.69 ± 0.24 | 0.42 ± 0.02 | 34.6 ± 1.2 | 30.9 ± 1.2 |
| After | Control | 0.67 ± 0.18 | 0.31 ± 0.03 | 34.4 ± 1.8 | 29.8 ± 1.2 |
| Treatment | Test | 1.38 ± 0.44 | 0.62 ± 0.12 | 42.9 ± 1.8 | 39.9 ± 2.1 |
| 1st Day | Control | 0.7 ± 0.14 | 0.35 ± 0.06 | 32.9 ± 1.8 | 29.7 ± 1.8 |
|  | Test | 1.37 ± 0.33 | 0.52 ± 0.05 | 38.3 ± 2.0 | 34.0 ± 0.8 |
| 2nd Day | Control | 0.71 ± 0.13 | 0.32 ± 0.03 | 32.9 ± 0.8 | 29.5 ± 1.2 |
|  | Test | 1.23 ± 0.26 | 0.50 ± 0.04 | 38.5 ± 2.3 | 34.4 ± 1.6 |
| 3th Day | Control | 0.72 ± 0.21 | 0.35 ± 0.03 | 33.3 ± 1.6 | 29.8 ± 1.1 |
|  | Test | 1.30 ± 0.17 | 0.49 ± 0.02 | 39.6 ± 1.9 | 34.6 ± 1.0 |
| 4th Day | Control | 0.67 ± 0.09 | 0.33 ± 0.04 | 35.3 ± 1.1 | 30.9 ± 0.9 |
|  | Test | 1.12 ± 0.14 | 0.49 ± 0.04 | 39.4 ± 1.5 | 35.0 ± 1.2 |
| 5th Day | Control | 0.75 ± 0.14 | 0.32 ± 0.03 | 34.6 ± 1.3 | 31.0 ± 1.3 |
|  | Test | 1.10 ± 0.31 | 0.47 ± 0.09 | 39.5 ± 2.2 | 34.6 ± 1.1 |
| 6th Day | Control | 0.85 ± 0.24 | 0.32 ± 0.05 | 34.3 ± 1.3 | 31.0 ± 1.35 |
|  | Test | 1.35 ± 0.44 | 0.51 ± 0.05 | 39.8 ± 2.0 | 35.3 ± 1.4 |

*Surround. = Surroundings of Lib eye.

Figure 1:
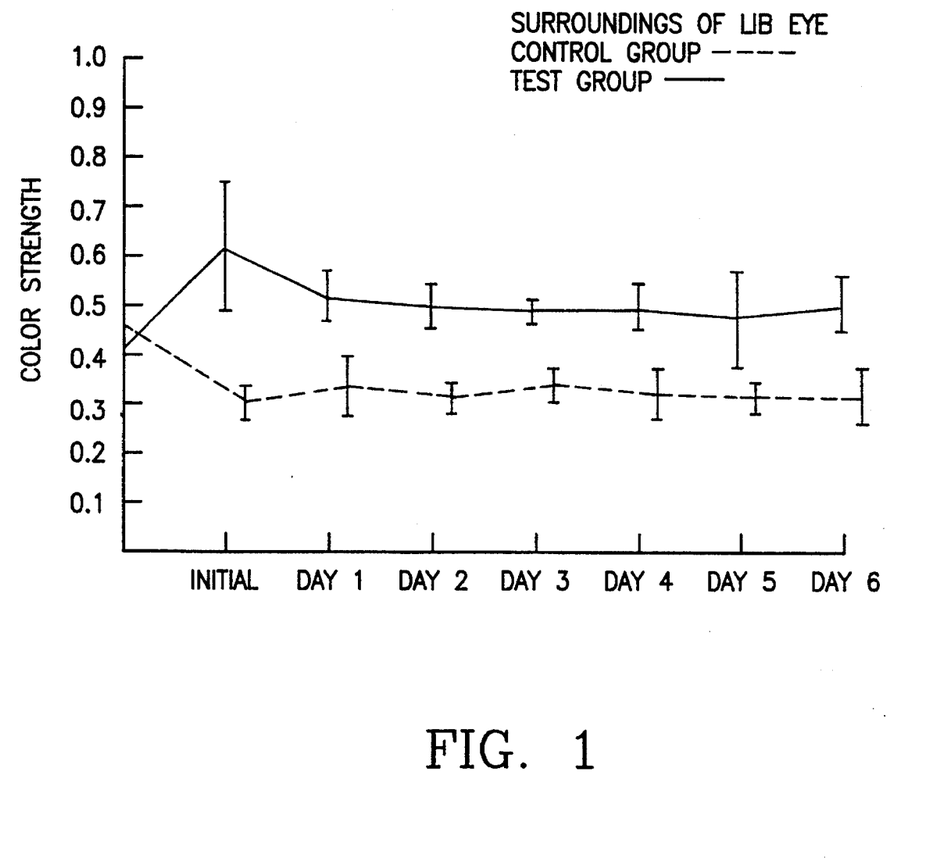
FIG. 1 is a graph showing the change of the color strength (tan θ) of surroundings of Lib eye.
Figure 2:
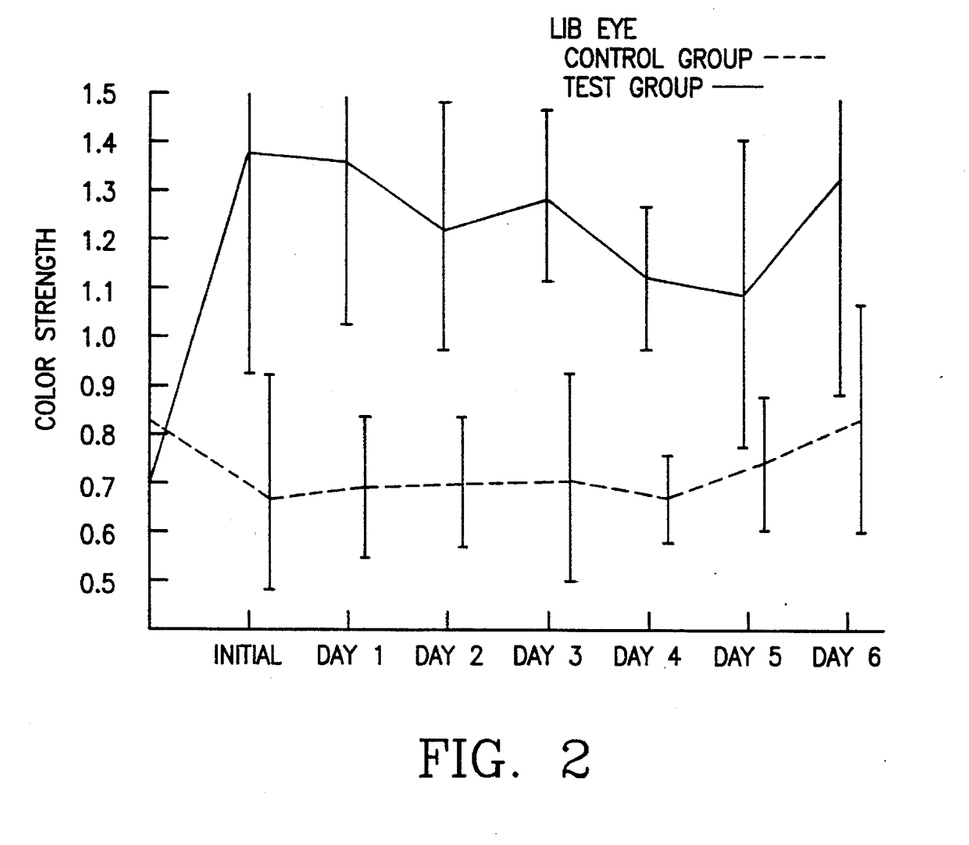
FIG. 2 is a graph showing the change of the color strength (tan θ) of Lib eye.

In the above tables, the "color score" indicates the color of the meat, and "$\tan \theta$" is an indicator of color strength. FIGS. 1 and 2 are graphs showing the values of $\tan \theta$ listed in Table 2. Graphs of the values of $\sqrt{(L^2+a^2+D^2)}$, which is an indicator of chroma, are shown in FIGS. 3 and 4.

FIGS. 1 and 2 indicate the change of the color strength ($\tan \theta$) of the Lib eye and surroundings of Lib eye, respectively. The solid line in these graphs indicates the mean of $\tan \theta$ in the Experimental Group (a treated group), and the dotted line indicates the mean of $\tan \theta$ in the Control Group (the untreated group). The abscissa indicates days after treatment and the ordinate indicates the value of $\tan \theta$.

Figure 3:
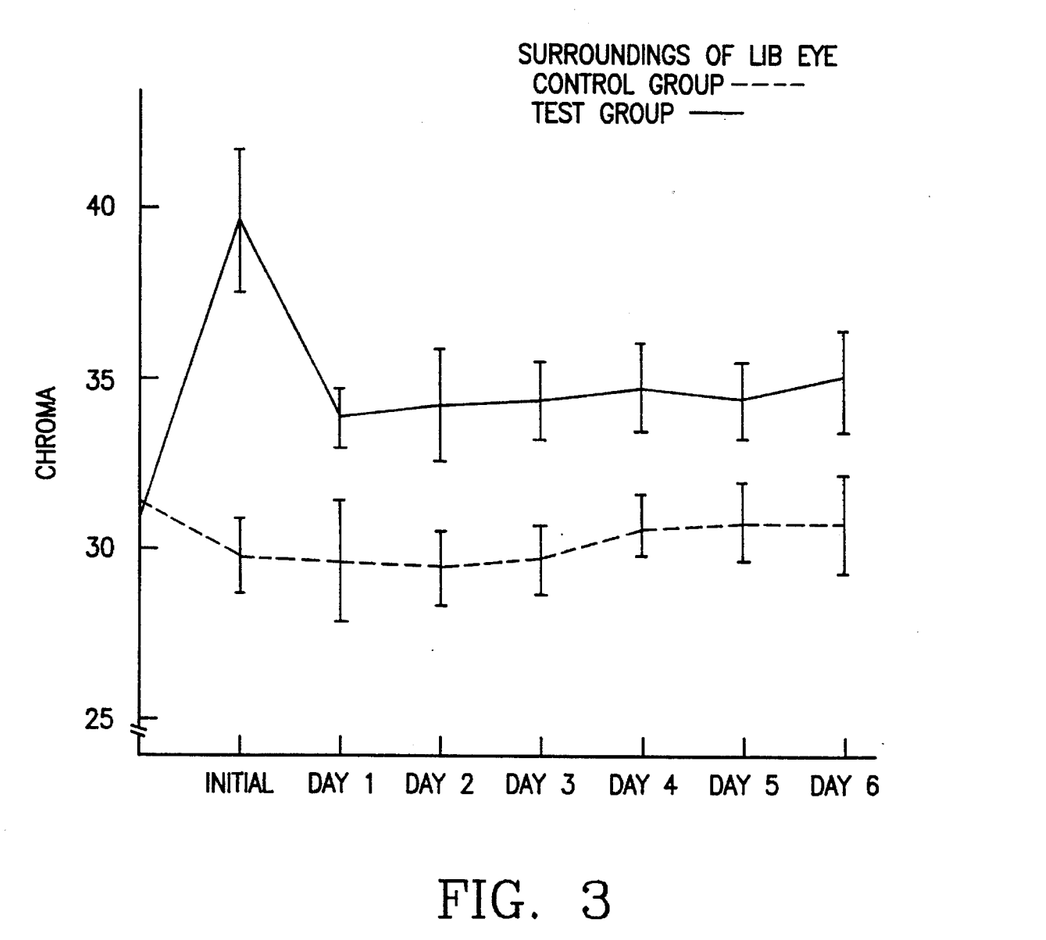
FIG. 3 is a graph showing the change of chroma, $\sqrt{(L^2+a^2+b^2)}$ of surroundings of Lib eye.
Figure 4:
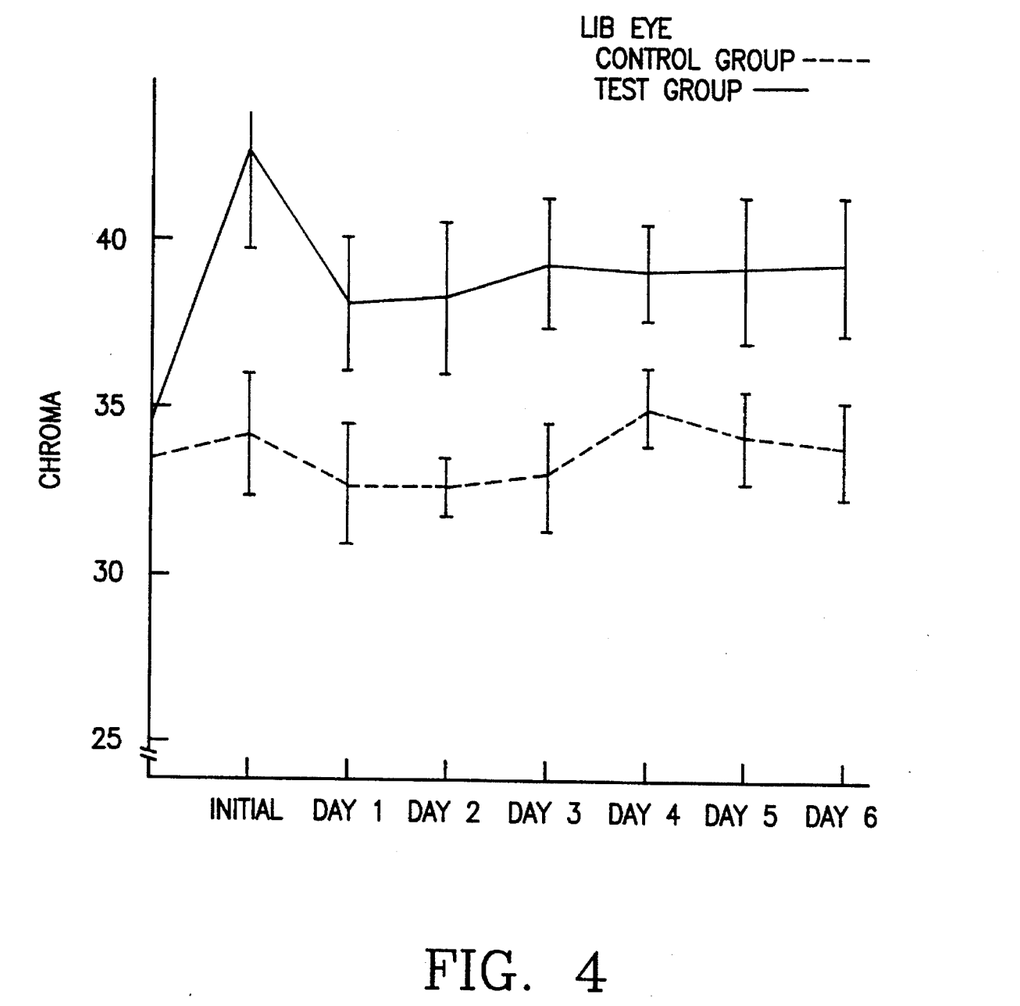
FIG. 4 is a graph showing the change of chroma, $\sqrt{(L^2+a^2+b^2)}$ of Lib eye.

FIGS. 3 and 4 indicate the change of chroma, $\sqrt{(L^2+a^2+D^2)}$, of the Lib eye and surroundings of Lib eye, respectively. The solid line in these figures indicates the mean of chroma in the Experimental Group (the treated group), and the dotted line indicates the mean of chroma in the Control Group (the untreated group). The abscissa indicates days after treatment and the ordinate indicates the value of chroma.

It can be seen from the above results that the color of meat is maintained in the Experimental Group in contrast with the Control Group. Therefore, ubidecarenone is useful as an agent for maintaining the freshness of meat, especially the color of meat.

The mechanism by which the present agent can maintain the color of meat has not been completely elucidated, but it is considered to involve proteins such as cytochrome in electron transport system and myoglobin.

EXPERIMENT II

1. Experimental Method

Tuna, mackerel, and deep snapper were sprayed with grades containing ubidecarenone and tocopherol, stored at $-10°$ C. and observed with respect to the change of body color, the conditions of oxidation, and the change of K values.

Particularly, each of 5 cm cubes of tuna, and pieces of mackerel and deep snapper sold on the market were sprayed with the liquid containing ubidecarenone used in Experiment I and with that further containing vitamin E (20 mg of ubidecarenone, 400 IU of vitamin E, 600 mg of lecithin, 10 g of sorbit and q.s.purified water to form 500 ml), separately. After spraying, each cube of tuna, and each piece of mackerel and deep snapper were wrapped with Saran wrap and stored at $-10°$ C.

2. Results

1) Change of Body Color of Deep Snapper

The measurement of body color was carried out using the colorimetry color difference meter employed in Experiment I. The obtained results are shown in the following Table 3.

TABLE 3

|  |  | Water | Ubidecarenone | Ubidecarenone + Vitamin E |
|---|---|---|---|---|
| One | L | 43 | 39 | 38 |
| Month | a | 3.1 | 2.5 | 2.2 |
| After | b | 3.6 | 3.9 | 4.0 |
|  | a + b | 6.9 | 6.4 | 6.2 |
| Three | L | 68 | 52 | 46 |
| Months | a | 4.3 | 3.5 | 3.2 |
| After | b | 4.9 | 3.8 | 3.7 |
|  | a + b | 9.2 | 7.3 | 6.9 |

2) Change of Peroxide Value (POV) during Storage of Mackerel

POV is the value obtained by analysis of oxidation-reduction reaction, i.e., by titration of liberated iodine with sodium thiosulphate standard solution, which iodine is liberated by the reaction of peroxide and potassium iodide. The results are shown in Table 4.

TABLE 4

| Storage period | Water | Ubidecarenone | Ubidecarenone + Vitamin E |
|---|---|---|---|
| one month | 120 | 50 | 35 |
| two months | 630 | 101 | 72 |

3) Change of K Value of Tuna

K value is a value obtained by determining nucleic acid and related substances and calculating according to the following formula. It is useful for evaluation of freshness. Fresh fish contains especially much ATP. When the total content of ATP, ADP, AMP and IMP is high, the fish has good freshness. In other words, when the K value is low, the freshness of fish is good. The results are shown in Table 5.

TABLE 5

| Storage period | Water | Ubidecarenone | Ubidecarenone + Vitamin E |
|---|---|---|---|
| one month | 18.9% | 8.6% | 7.7% |
| two months | 40.4% | 16.3% | 13.2% |

$$\text{K value} = \frac{H_xR + H_x}{ATP + ADP + AMP + IMP + H_xR + H_x} \times 100$$

ATP: adenosine triphosphate (nucleotide)
ADP: adenosine diphosphate (nucleotide)
AMP: adenosine monophosphate (nucleotide)
IMP: inosinic acid
$H_xR$: inosine (nucleoside)
$H_x$: hypoxanthine (purine derivative)

It can be seen from the above results that spraying ubidecarenone on the fish could suppress the change of color and oxidation and therefore could maintain the freshness more than in the control group (water group). Accordingly, ubidecarenone is useful as an agent for maintaining the freshness of fish meat.

EXPERIMENT III

1. Experimental Method 24 large white castrated pigs were fed on the following feed for about one month from the time of 80 kg of body weight to shipment, and were observed with respect to the growth promoting effect and percentage of feed demand.

Control Group: basic feed

Experiment Group I: basic feed supplemented with 10 mg/kg of ubidecarenone

Experiment Group II: basic feed supplemented with 10 mg/kg of ubidecarenone and 50 IU/kg of vitamin E The formulation and nutrient composition of basic feed are shown in Table 6.

TABLE 6

| Formulation | | Nutrient Composition | |
|---|---|---|---|
| Corn | 71% | Crude Protein | 14.5% |
| Bean Cake | 22% | Crude Fiber | 5.0% |
| Born meal | 2% | Crude Fat | 2.5% |
| Rice Bran | 1% | Crude Ash Content | 7.0% |
| Others | 4% | Digestible Crude Protein | 12.5% |
| (Animal Fat and Oil, | | Digestible Total Nutrient | 77.0% |
| Molasses, Calcium | | | |
| Carbonate, Calcium | | | |
| Phosphate, Salt, | | | |
| Premixed Vitamin) | | | |

The pigs were slaughtered and cut up in a conventional manner after being fed the above feed, and the quality of meat was examined with the passage of days. Particularly, slices of meat measuring 5 mm thick were obtained from pork muscle Longissmus dorsi of the control group, experiment group I, and experiment group II, wrapped with Saran wrap and stored at 4° C. The color of these slices was measured with a color difference meter for 7 days after slaughter.

2. Results

Figure 5:
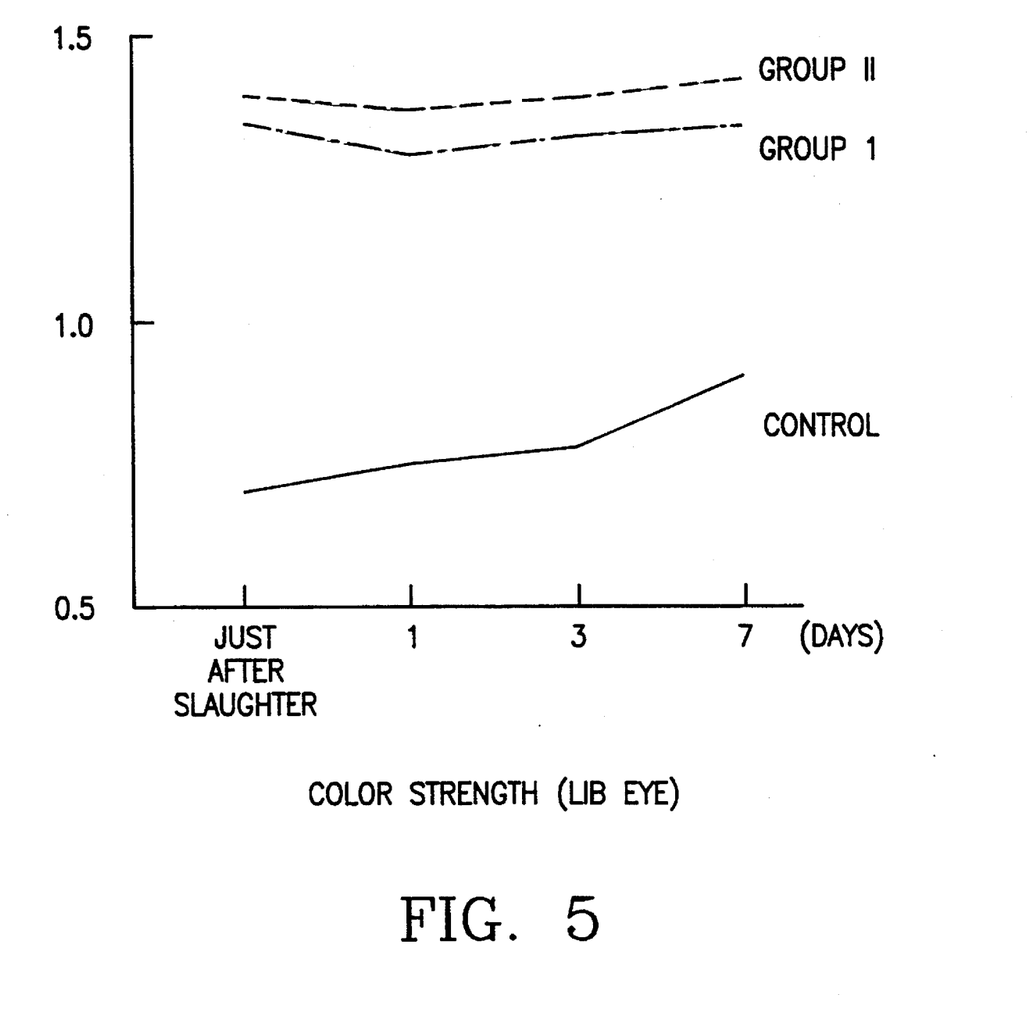
FIG. 5 is a graph showing the change of color strength of Lib eye.
Figure 6:
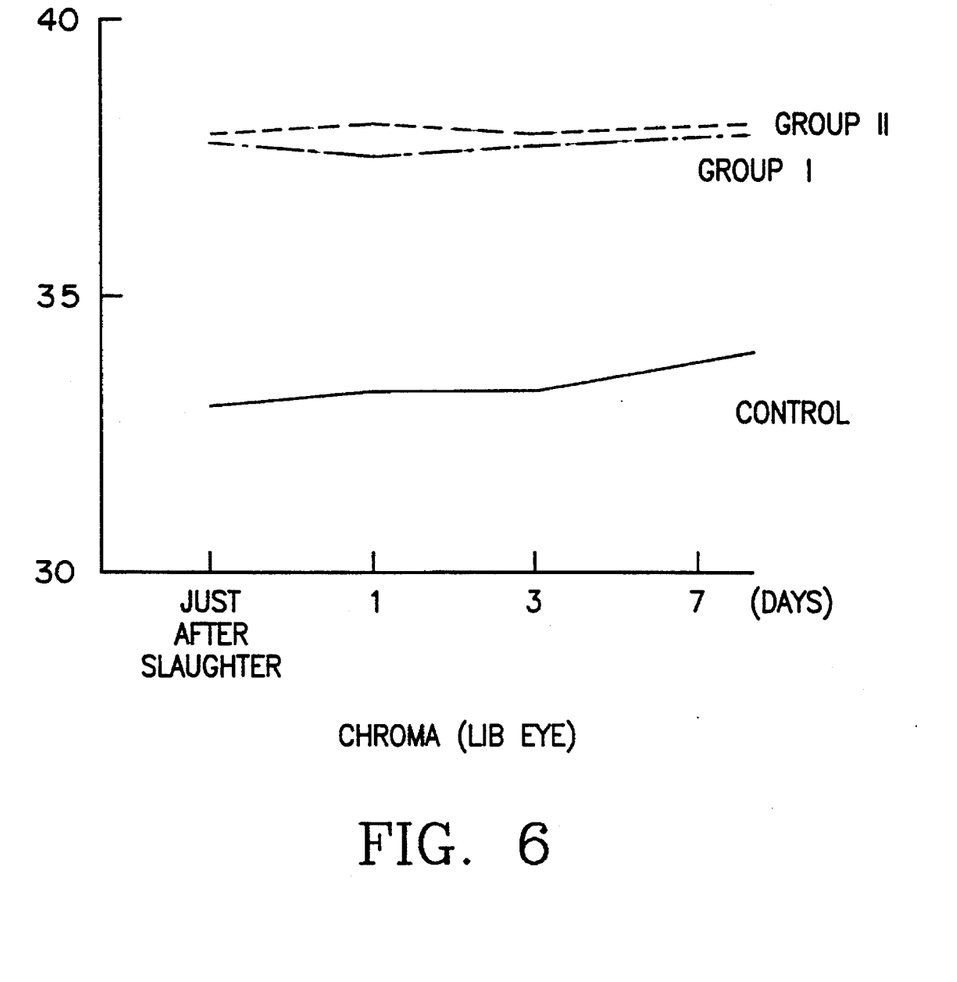
FIG. 6 is a graph showing the change of chroma of Lib eye.

The growth promoting effect and percentage of feed demand are shown in Table 7. Also, color score, color strength and chroma of the meat are shown in Table 8, FIG. 5, and FIG. 6, respectively.

TABLE 7

| Test Results | | | |
|---|---|---|---|
| | Control | Group I | Group II |
| Test Pigs | 8 | 8 | 8 |
| Initial Body Weight | 86.0 | 84.9 | 84.8 |
| Final Body Weight | 108.1 | 110.9 | 110.9 |
| Weight Gain | 22.1 | 26.0 | 26.1 |
| Weight Gain per Day | 754 g | 870 g | 900 g |
| Mean Breeding Period (Days) | 29.0 | 29.0 | 29.0 |
| Total Intake of Feed | 740 kg | 800 kg | 752 kg |
| Intake of Feed per Day | 3.18 kg | 3.34 kg | 3.24 kg |
| Percentage of Feed Demand | 4.22 | 3.84 | 3.60 |

TABLE 8

| Change of Color Score | | | |
|---|---|---|---|
| | Color Score | | |
| | Control | Group I | Group II |
| Just After Slaughter | 3.8 | 2.9 | 2.7 |
| One Day After | 3.9 | 3.3 | 3.1 |
| 2 Days After | 4.1 | 3.5 | 3.4 |
| 7 Days After | 4.7 | 3.6 | 3.6 |

It is apparent from the experimental results in the above Table 8 that the use of ubidecarenone as a feed additive for animals can maintain the color of meat, i.e., the freshness of meat as in the case of dipping in Experiment I. Also, it was proved that the combination of ubidecarenone and vitamin E is more effective than the sole administration of ubidecarenone.

Furthermore, it was confirmed that the use of ubidecarenone can promote growth in animals and can improve the percentage of feed demand when administered to animals as a feed additive.

Therefore, ubidecarenone is useful as an agent for maintaining the freshness of meat, especially the color of meat, and it is also effective for promoting growth of animals or improving the productivity of breeders of animals for the production of meat.

EXPERIMENT IV

1. Experimental Method

In a field test, broilers were fed on feed supplemented with red yeast containing ubidecarenone and vitamin E, and the effect of ubidecarenone on the improvement of productivity and quality of meat were examined.

As an indication of the productivity, the weight gain, the percentage of shipped hens, and the percentage of feed demand were examined. As an indication of quality, the change of K values was determined in chicken meat which was kept in cold storage at 4° C. after slaughter and cutting.

Hens to be examined in this test were 3,000 broiler hens, and the feed used was commercially available broiler feed (the first stage: CP 23%, ME 3,100 kcal/kg, the latter stage: CP 18%, ME 3,170 kcal/kg)
Control Group: basic feed
Experiment Group I: basic feed supplemented with red yeast (5 mg/kg as ubidecarenone)
Experiment Group II: basic feed supplemented with red yeast (5 mg/kg as ubidecarenone) and 25 IU/kg of vitamin E
2. Results
(1) Results of Growth

TABLE 9

|  | Control (Basic Feed) | Group I | Group II |
| --- | --- | --- | --- |
| 3 Weeks Old | 753 g | 751 g | 764 g |
| 5 Weeks Old | 1,497 g | 1,620 g | 1,788 g |
| 8 Weeks Old | 3,012 g | 3,580 g | 3,690 g |
| Intake | 6,647 g | 6,766 g | 6,383 g |
| Feed Demand | 2.21 | 1.89 | 1.73 |
| Bred Hens | 1,000 | 1,000 | 1,000 |
| Shipped Hens | 940 | 991 | 983 |
| Percentage of Breeding | 94% | 99.1% | 98.3% |

TABLE 10

| Storage Period | Control | Group I | Group II |
| --- | --- | --- | --- |
| One Week | 12.8% | 7.9% | 6.5% |
| 3 Weeks | 23.5% | 8.3% | 7.1% |
| 5 Weeks | 41.0% | 14.9% | 12.6% |

It can be seen from the experimental results shown in Tables 9 and 10 that the productivity is improved and the quality of chicken meat is maintained relative to the control group when red yeast containing ubidecarenone is added to the feed for broilers. Therefore, ubidecarenone is useful as an agent for improving the productivity of breeders of broilers and as an agent for maintaining the freshness of broilers.

The following examples are given to further illustrate the present invention.

EXAMPLE 1

A concentrated liquid for maintaining the freshness of meat is prepared as follows.

50 g of ubidecarenone, 50 g of hydrogenated lecithin and 200 ml of water were mixed. The resulting mixture was heated and subjected to ultrasonic treatment under nitrogen gas for 90 minutes to form an aqueous liquid. To this liquid, 100 g of sorbit and water were added to form 1 liter of liquid, which was subjected to sterilization and was charged into the desired vessel as concentrated liquid.

A pig (weighing about 110 kg) was slaughtered and then its head was cut off and its internal organs and skin were removed. Then, 1 liter of the above concentrated liquid of the present agent which had been previously prepared was added to 1 ton of water in a vessel which was large enough to place a block of pork, and the resulting mixture was stirred well by a stirrer.

The pork prepared above was kept in this vessel at 4° C. for 4 hours and then raised by a hook connected to a pulley, wiped off with cloth, optionally kept in refrigerated storage, and shipped. The shipped meat did not exhibit any change of color apparent to the naked eye even after 2 weeks.

EXAMPLE 2

A liquid for maintaining the freshness of meat was prepared as follows.

5 g of ubidecarenone, 5 g of hydrogenated lecithin and 100 ml of water were mixed, and the resulting mixture was heated and subjected to ultrasonic treatment under nitrogen gas for 90 minutes to form an aqueous solution. 10 mg of sorbit and water were added to this to form 1 liter of solution, which was charged into a vessel for spraying.

After a Holstein (weighing about 250 kg) was slaughtered and then its head was cut off and its internal organs were removed, the obtained beef was hung by a pulley. The hanging beef was sprayed all over with the above solution in the vessel. This beef was wiped off with cloth, optionally kept in refrigerated or frozen storage, and shipped. The shipped meat did not exhibit any change of color apparent to the naked eye even after one month in refrigerated storage.

EXAMPLE 3

A concentrate for maintaining freshness was prepared in the same manner as in Example 1.

Broilers (weighing 2.5 kg) were slaughtered and then their heads were cut off and feathers were removed. The above concentrate was added to a chiller layer which was previously filled with water and ice so that the present agent for maintaining freshness was present in a concentration of 20 ppm. The broiler was passed through the chiller layer and cut in a conventional manner to be shipped. The shipped chicken did not show any considerable change in quality after one week in refrigerated storage.

EXAMPLE 4

A liquid agent for maintaining the freshness of fish was prepared as follows.

5 g of ubidecarenone, 25 g of vitamin E, 30 g of hydrogenated lecithin and 200 ml of water were mixed, and the resulting mixture was heated and subjected to ultrasonic treatment under nitrogen gas for 90 minutes to form an aqueous solution. 60 mg of sorbit and water were added to the solution to form 1 liter of solution, which was sterilized and charged into a desired vessel as a concentrate.

The concentrate was added to water and ice to form a cold liquid in which ubidecarenone was present in a concentration of 10–25 ppm. Deep snapper, tuna, and young yellowtail which had been caught were dipped in the cold liquid and then shipped. Alternatively, the caught fishes may be sprayed with the above concentrate and stored in refrigerated or frozen storage. After treatment, there was no change in the color of the body, surface or meat during one month in cold storage.

EXAMPLE 5

Red yeast containing a large amount of ubidecarenone (5 mg/kg as ubidecarenone) and vitamin E (25 mg/kg) or vitamin C (50 mg/kg) were added to each of commercially available mixed feed for pigs, feed for broilers in the latter stage and feed for beef cattle. These feeds were fed to the animals during 1–3 months before shipment. The feed had the following formulation and nutrient composition shown in Tables 11–13.

TABLE 11

<Formula 1> Feed for Pigs

| Formulation | | Nutrient Composition | |
|---|---|---|---|
| Corn | 71% | Crude Protein | 14.5% |
| Bean Cake | 22% | Crude Fat | 2.5% |
| Born Meal | 2% | Crude Fiber | 5.0% |
| Rice Bran Cake | 1% | Crude Ash Content | 7.0% |
| Others | 4% | Calcium | 0.5% |
| (Animal Fat and Oil, | | Phosphorus | 0.4% |
| Calcium Carbonate, | | DCP | 12.5% |
| Calcium Phosphate, | | TDN | 75.0% |
| Salt, Premixed | | | |
| Vitamin) | | | |
| Red Yeast | 5 mg/kg | | |
| (as Ubidecarenone) | | | |
| Vitamin E | 25 mg/kg | | |

TABLE 12

<Formula 2> Feed for Broiler in the Latter Stage

| Formulation | | Nutrient Composition | |
|---|---|---|---|
| Corn | 65% | Crude Protein | 18.0% |
| Bean Cake | 21% | Crude Fat | 4.0% |
| Fish Meal | 8% | Crude Fiber | 5.0% |
| Others | 6% | Crude Ash Content | 8.0% |
| (Animal Fat and | | Calcium | 0.7% |
| Oil, Calcium | | Phosphorus | 0.6% |
| Carbonate, Salt) | 5 mg/kg | ME | 3.170 kcal/kg |
| Red Yeast (as | | | |
| Ubidecarenone) | | | |
| Vitamin C | 50 mg/kg | | |

TABLE 13

<Formula 3> Feed for Beef Cattle

| Formulation | | Nutrient Composition | |
|---|---|---|---|
| Corn, Wheat, Braley, | 75% | Crude Protein | 11.5% |
| Milo | | Crude Fat | 2.0% |
| Wheat Bran | 10% | Crude Fiber | 10.0% |
| Bean Cake | 9% | Crude Ash Content | 9.0% |
| Others | 6% | Calcium | 0.4% |
| (Molasses, Yeast for | | Phosphorus | 0.3% |
| Feed, Calcium Carbon- | | TCP | 9.5% |
| ate, Salt) | | TDN | 74.0% |
| Red Yeast | 10 mg/kg | | |
| (as Ubidecarenone) | | | |
| Vitamin E | 50 mg/kg | | |

The meat which was obtained by slaughtering the animals fed on the above feed maintained its color and freshness, as in the case in which the animals after slaughter were treated with the present agent for maintaining freshness.

EXAMPLE 6

Red yeast containing a large amount of ubidecarenone (20 mg/kg as ubidecarenone) and vitamin E (100 mg/kg) or vitamin C were added to a commercially available feed for deep snapper moist (the formulation thereof is shown in Table 14 and the nutrient composition thereof is shown in Table 15). Deep snappers were fed on this feed during one month before shipment.

TABLE 14

<Formula> Feed for Deep Snapper Moist Formulation

| Material | Amount |
|---|---|
| Fish Meal | 55% |
| Bean Cake | 20% |
| Rice Bran Cake | 10% |
| Wheat | 9% |
| Others | 6% |
| (Dicalcium phosphate, Guar Gum, | |
| Yeast for Feed, Liver Powder) | |
| Red Yeast | 20 mg/kg |
| (as Ubidecarenone) | |
| Vitamin E | 100 mg/kg |
| Vitamin C | 100 mg/kg |

TABLE 15

| Nutrient Composition | |
|---|---|
| Crude Protein | 50.0% |
| Crude Fat | 30.0% |
| Crude Fiber | 4.0% |
| Crude Ash Content | 15.0% |
| Calcium | 1.5% |
| Phosphorus | 1.2% |

It has become apparent that deep snappers which were fed on the above feed, caught and then shipped did not exhibit a change in the color of their body surface.

It will be appreciated by those skilled in the art that numerous variations and modifications may be made to the invention as described above with respect to specific embodiments without departing from the spirit or scope of the invention as broadly described.

What is claimed is:

1. A method for preventing meat or fish from discoloring, comprising feeding ubidecarenone to an animal being bred for the production of meat or fish, under conditions and in an amount effective to inhibit oxidation of haem pigments contained in said meat or fish and thereby prevent discoloration of said meat or fish.

2. The method according to claim 1, wherein ubidecarenone is fed to said animal by providing the animal with feed containing ubidecarenone as a feed additive.

3. The method according to claim 2, wherein the feed contains 5–200 ppm as ubidecarenone.

4. The method according to claim 2, wherein the feed further comprises at least one selected from vitamin E and vitamin C.

5. The method according to claim 4, wherein ubidecarenone is used in the form of microorganisms containing ubidecarenone.

6. The method according to claim 2, wherein ubidecarenone is used in the form of a purified product.

7. The method according to claim 2, wherein ubidecarenone is used in the form of microorganisms containing ubidecarenone.

8. The method according to claim 1, wherein ubidecarenone is used in the form of a purified product.

* * * * *